(12) United States Patent
Mattathil

(10) Patent No.: US 6,807,169 B2
(45) Date of Patent: Oct. 19, 2004

(54) DYNAMIC PRIVATE NETWORK

(76) Inventor: George P. Mattathil, P.O. Box 249, San Bruno, CA (US) 94066

( * ) Notice: Subject to any disclaimer, the term of this patent is extended or adjusted under 35 U.S.C. 154(b) by 0 days.

(21) Appl. No.: 10/168,575

(22) PCT Filed: Nov. 30, 2001

(86) PCT No.: PCT/US01/47562

§ 371 (c)(1),
(2), (4) Date: Jun. 21, 2002

(87) PCT Pub. No.: WO02/45281

PCT Pub. Date: Jun. 6, 2002

(65) Prior Publication Data

US 2002/0191618 A1 Dec. 19, 2002

Related U.S. Application Data

(60) Provisional application No. 60/250,783, filed on Nov. 30, 2000.

(51) Int. Cl.[7] .............................................. H04L 12/66
(52) U.S. Cl. ...................................... 370/352; 370/401
(58) Field of Search ................................ 370/351, 352, 370/353, 354, 356, 389, 395.5, 395.53, 395.54, 431, 437, 438, 439, 440, 442, 443, 400, 401, 409, 410

(56) References Cited

U.S. PATENT DOCUMENTS

| | | | | |
|---|---|---|---|---|
| 5,592,477 A | * | 1/1997 | Farris et al. ................. 370/396 |
| 5,717,796 A | * | 2/1998 | Clendening .................. 385/24 |
| 5,802,047 A | * | 9/1998 | Kinoshita ................... 370/359 |
| 5,850,386 A | * | 12/1998 | Anderson et al. ........... 370/241 |
| 5,852,746 A | * | 12/1998 | Barrett ........................ 710/19 |
| 5,959,251 A | * | 9/1999 | English et al. ............... 174/66 |
| 6,064,653 A | * | 5/2000 | Farris ......................... 370/237 |
| 6,084,956 A | | 7/2000 | Turner et al. |
| 6,134,956 A | | 10/2000 | Salamat et al. |
| 6,226,751 B1 | | 5/2001 | Arrow et al. |
| 6,421,337 B1 | * | 7/2002 | Rao et al. ................... 370/351 |

OTHER PUBLICATIONS

PCT ISA/US, International Search Report for PCT/US01/47562 dated May 13, 2002.

* cited by examiner

Primary Examiner—Alpus H. Hsu
Assistant Examiner—Daniel Ryman
(74) Attorney, Agent, or Firm—Raymond E. Roberts; Intellectual Property Law Offices

(57) ABSTRACT

A dynamic private network (DNP)(100) for use in a tele or other communications infrastructure (102) to communicate between customer premises equipment CPE (30) via a network matrix (26). A DPN router (104) connects logical networks (106) having the CPE (30) to a datapath node (152). Datapath nodes (152) connect together to form a datapath network (182), that is controlled by status control nodes (154) and operation control nodes (156) or a status control network (184) and an operation control network (186) In particular, telephone numbers and media control (MAC) addresses may be used to identity the logical networks (106) and CPE (30) in general telecommunications contexts, regardless of whether the CPE (30) are of analog or digital type

34 Claims, 13 Drawing Sheets

DPN Architecture

DPN Module Functions

Step 1. Circuit establishment

Step 2. Link establishment (layer 2)

Step 3. Establish control channel

Step 4. Ethernet(MAC) switching of packets
or
packet forwarding for non-MAC protocols DPN Switching Router DPN Setup Procedure DPN State Transitions DPN Feedback System Generalized DPN Architecture DPN Adjacent Nodes Maximal Connectivity Generalized DPN Topology Network Protection Framework

DYNAMIC PRIVATE NETWORK

CROSS-REFERENCE TO RELATED APPLICATIONS

This application claims the benefit of U.S. Provisional Application No. 60/250,783, filed Nov. 30, 2000.

TECHNICAL FIELD

The present invention relates generally to communications, and more particularly to network communications over the present telecommunications infrastructure and emerging self-contained networks using public telephone switching systems, Internet and telephony protocol networks, special service networks, and high capacity networks.

BACKGROUND ART

Currently virtual private network (VPN) is a very popular method for achieving private network connectivity between distributed locations by using public networks, like the Internet, frame relay networks, etc. In VPN, different schemes are implemented to limit the routing of the network packets to destination nodes that are part of the VPN, thereby creating the effect of having a dedicated private network. The use of public packet networks was a natural choice for this, as the cost of deploying packet technology was lower than building dedicated network connections.

Recent developments in fiber optics have resulted in a new reality, however, in which there is excess bandwidth available on backbone network segments with the use of dense wavelength division multiplexing (DWDM). Using this ample availability of bandwidth another method for building private networks can be implemented, one which the present inventor terms "dynamic private network" (DPN). A key principle in DPN is to use well known circuit switching techniques, as used in telephone networks, and to apply these to provide on-demand connections for carrying packet traffic. The present inventor's prior invention, a bandwidth transfer switching system (BTSS), provides one logical framework for implementing DPN.

FIG. 1 (background art) is a block diagram depicting the existing communications infrastructure 10. Various devices may communicate via this infrastructure 10, and users today often have and use multiple such devices, like telephones 12a, facsimiles 12b, modems 12c, computers 12d, special service devices 12e, and local area networks (LAN 12f) (representing collections of computers and other network enabled equipment behind a router or switch). Examples of these are shown here connected to a public switched telephone network (PSTN 14). The telephones 12a and facsimiles 12b are analog devices which may communicate with respective like devices. The modems 12c stylistically depict the still common situation of digital devices producing digital signals that are converted to, from, and generally communicated as analog type signals. In contrast, the computers 12d, special service devices 12e, and LAN 12f here are true digital devices.

While the presence of computers 12d and LAN 12f in the existing infrastructure 10 is relatively well known, the use of special service devices 12e may be less widely appreciated. These are, however, increasingly common today. Some examples include remote monitorable utility meters and alarm systems. Such special service devices 12e typically require a much lower data transfer rate than systems like the computers 12d and LAN 12f.

For communications between the respective sets of like devices, the analog "traffic" may travel entirely via the PSTN 14. In contrast, the digital traffic for the computers 12d and particularly the LAN 12f may start on the PSTN 14 and then proceed via an Internet protocol network (IP network 16). Similarly, the digital traffic for the special service device 12e may start on the PSTN 14 and then proceed via a signal switching network, like the signaling system 7 network (SS7 network 18) shown.

FIG. 2 (background art) is a block diagram depicting a more suitable network evolution model. A broadband network 22 and a generalized high capacity network 24 are added here, and video units 12g are an added device type. The various communications devices 12a–g here connect to an access network 20, and the access network 20 connects to the PSTN 14 (essentially the major central element already in the existing infrastructure 10). The access network 20 also connects to the IP network 16, the SS7 network 18, a broadband network 22, and the high capacity network 24. These collectively form a network matrix 26 in which the PSTN 14 handles analog traffic, the IP network 16 and the SS7 network 18 can handle most digital communications, and the broadband network 22 handles specialized high-bandwidth communications such as digital video.

The high capacity network 24 handles emerging very high-bandwidth digital communications. This is increasingly used as part of a communications "backbone," typically implemented in SONET/SDH/DSx. The high capacity network 24 is often implemented using fiber optics. But this is not necessarily the case. For example, satellite links are also used.

For this discussion, the scheme depicted in FIG. 2 can be termed a bandwidth transfer switching system (BTSS 28). The BTSS 28 is according to a previous invention by the present inventor, and is detailed in International App. No PCT/US00/01039 and U.S. pat. app. Ser. No. 09/622,252, hereby incorporated by reference in their entirety. The BTSS 28 provides an efficient and logical framework for implementing the present invention, but other conventional communications networks may also be used.

FIG. 3 (background art) is a block diagram showing an access network 20 and the linkages therein. Specifically, the access network 20 here is one as would be used in the BTSS 28. Of course, FIG. 3 depicts only one "end" of the BTSS 28, and at least one other instance of the access network 20 (or suitable equivalent) would be connected via the PSTN 14, the IP network 16, etc.

The access network 20 includes or is connected to customer premises equipment (CPE 30). The telephones 12a, facsimiles 12b, modems 12c, computers 12d, special service devices 12e, and LAN 12f of FIG. 1 are common examples of CPE 30. The access network 20 further includes an access concentrator 32, a remote concentrator 34, a transfer switch 36, and a central office switch 38. As covered in detail in the disclosures of BTSS, the access concentrator 32 and remote concentrator 34 are new under BTSS and the transfer switch 36 and central office switch 38 are essentially conventional. Furthermore, in some embodiments the remote concentrator 34 can be dispensed with, and the access concentrators 32 able to directly work with the transfer switches 36. This will be treated as the case throughout the rest of this discussion.

FIG. 1–3 summarize the existing communications infrastructure 10 and the BTSS 28 extension of it. Within this we find the current situation. Existing data protocols, like TCP/IP, are built for addressing the needs of connecting larger numbers of computers on a peer-to-peer basis (from a network point of view). However, with the widespread deployment and use of computing devices, there are actually three broad types of networking needs. First, there is the need to interconnect and inter operate with distributed network devices (with each network device viewed as a standalone entity from a network perspective). Second, there is the need for a remote device to connect to a group of network devices that form a functional group, i.e., logical networks (a group of network devices that provide a collection of applications and services, e.g., a corporate local area network (LAN)). This situation can be considered to be a special case of the following third case. Third, there is the need for distant logical networks (corporate LANs) to be seamlessly integrated to form a single logical unit (a distributed logical network), even though such may be geographically distributed.

Current Internet protocols were primarily developed to address the first need enumerated above, and this has left the second and third needs much wanting. Accordingly, what is needed is a combination of the best of both packet switching and circuit switching to leverage the existing communication infrastructure and technologies to produce superior functionality.

DISCLOSURE OF INVENTION

Accordingly, it is an object of the present invention to provide a dynamic private network (DPN) having superior network system performance and reduced system complexity.

Another object of the invention is to provide a framework for incrementally enhancing current network infrastructure for future network needs.

And another object of the invention is to provide network capabilities that are current not possible or feasible.

Briefly, one preferred embodiment of the present invention is a dynamic private network (DPN) for communicating between customer premises equipment (CPE). The DPN includes access concentrators each connecting to instances of the CPE to form logical networks. Dynamic private network routers (DPN routers) each connect to at least one such logical network. A datapath network connects the DPN routers, permitting communications between the CPE in the respective logical networks. And a status and control network (SOC network) connects to the datapath network to permit controlling operation of the DPN.

An advantage of the present invention is that it does provide superior network system performance and reduced system complexity.

Another advantage of the invention is that it does provide for incremental enhancement, both of the current network infrastructure and to permit rapid and efficient future network growth. The invention particularly enhances the functionality of existing network infrastructures without wholesale element replacement. Concurrently, the invention reduces the cost of building networks by decreasing the cost of network nodes, particularly due to decreased complexity.

And another advantage of the invention is that it does provide capabilities that are not otherwise possible or feasible, particularly with respect to network control and security. With regard to network security, the invention particularly permits efficiently handling growing threats such as denial of service (DoS) and distributed DoS (DDoS) attacks.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended figures of drawings in which.

In the various figures of the drawings, like references are used to denote like or similar elements or steps.

BEST MODE FOR CARRYING OUT THE INVENTION

Figure 1:
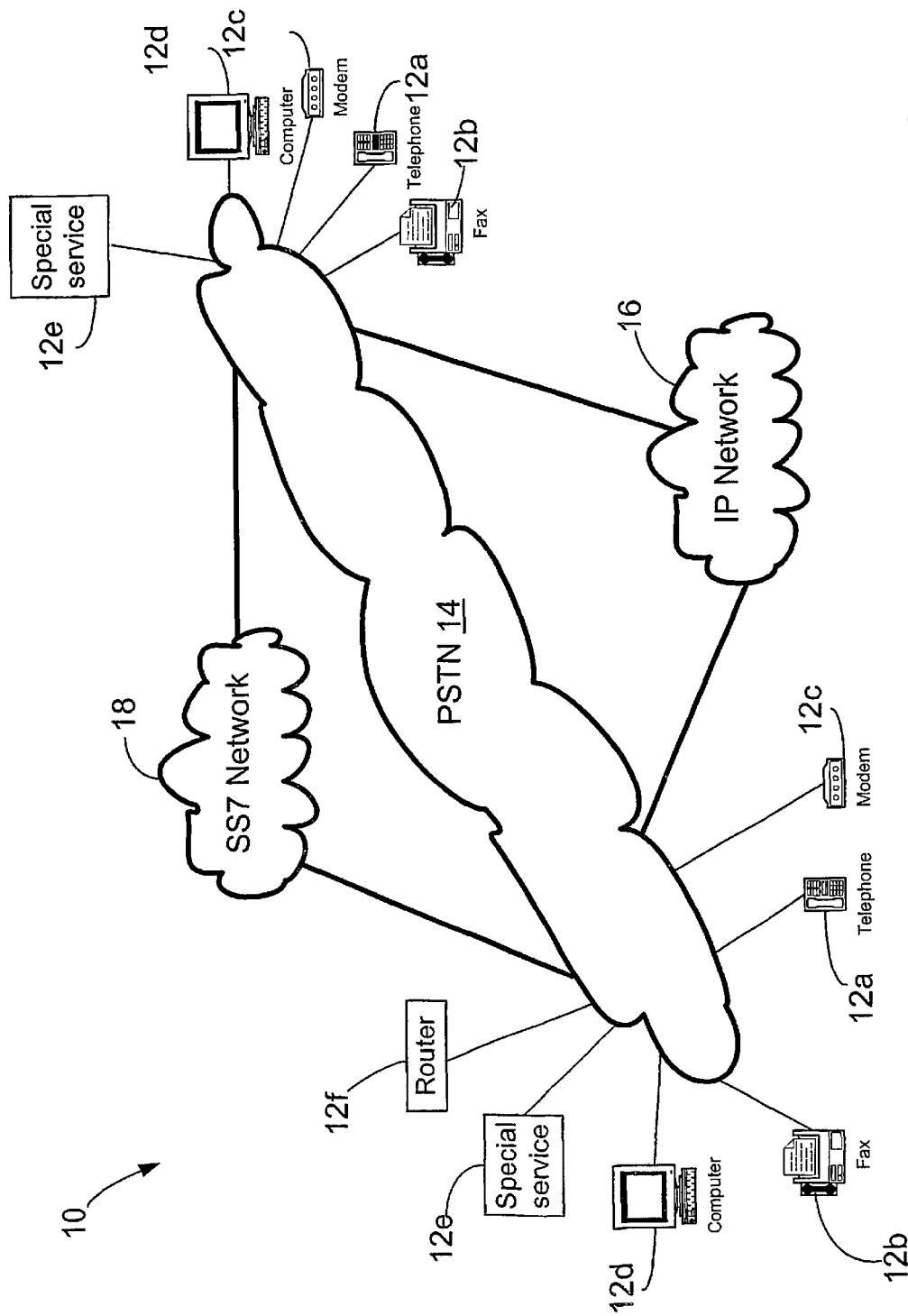
FIG. 1 (background art) is a block diagram depicting the existing communications infrastructure.

A preferred embodiment of the present invention is a Dynamic Private Network (DPN). As illustrated in the various drawings herein, and particularly in the view of FIG. 4, a form of this preferred embodiment of the invention is depicted by the general reference character 100.

Figure 2:
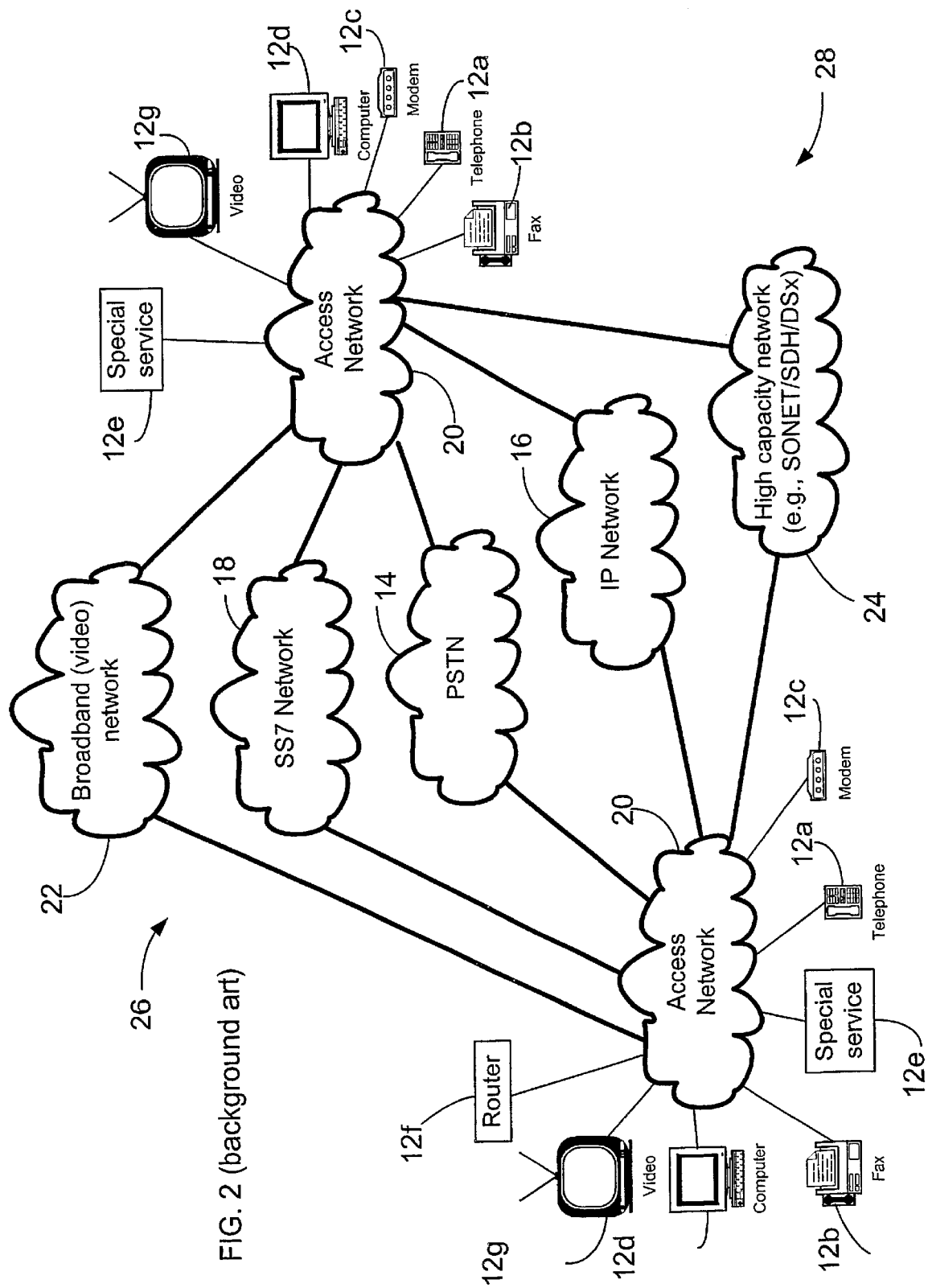
FIG. 2 (background art) is a block diagram depicting a more suitable network evolution model, specifically a bandwidth transfer switching system (BTSS) according to a previous invention by the present inventor.
Figure 3:
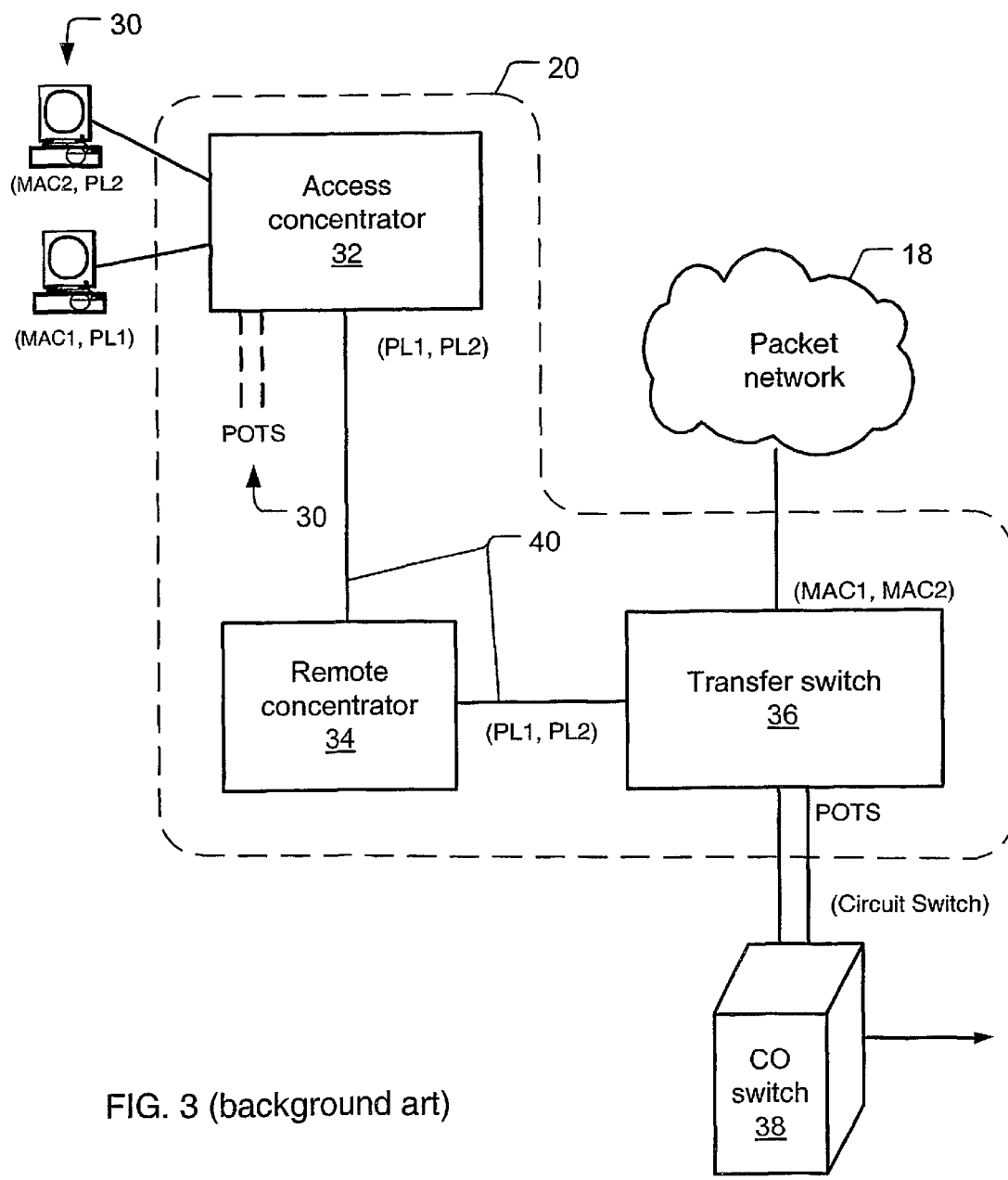
FIG. 3 (background art) is a block diagram showing an access network as may be present in the BTSS of FIG. 2, and the linkages therein.
Figure 4:
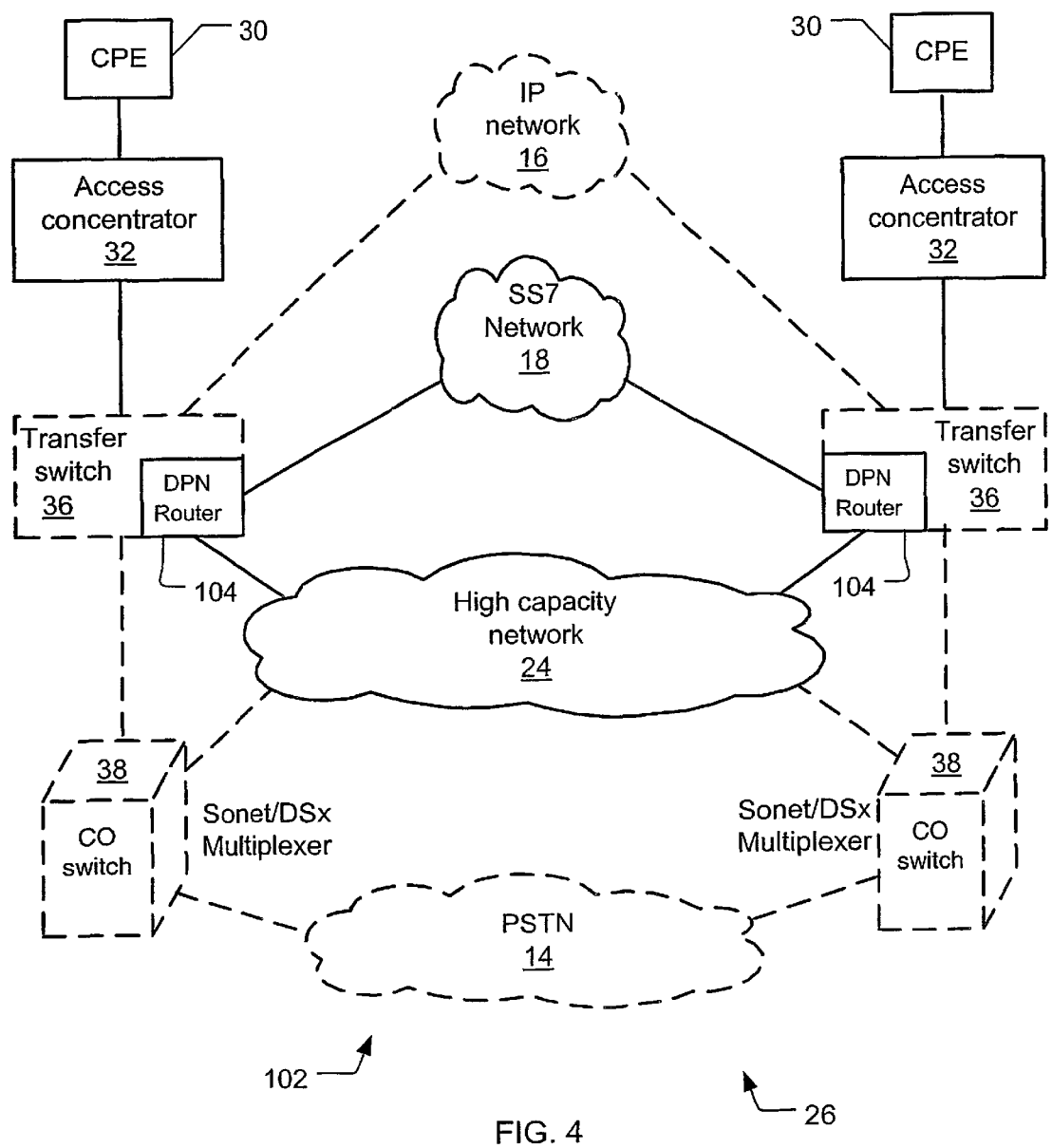
FIG. 4 is a block diagram depicting how a dynamic private network (DPN) according to the present invention integrates into a communications infrastructure collectively having networks like the public switched telephone network, an IP network, a signaling system 7 network, a broadband video network, a high capacity network, etc.

FIG. 4 is a block diagram depicting how a dynamic private network (DPN 100) according to the present invention integrates into a communications infrastructure 102 having the network matrix 26 (collectively networks like the PSTN 14, IP network 16, SS7 network 18, high capacity network 24 etc.) of FIG. 2–3. The salient differences here are the addition of a DPN router 104 at the transfer switch 36 and the reduced role of the PSTN 14.

Proceeding from either "end," one or more CPE 30 connect to the DPN router 104. The DPN router 104 then connects to the high capacity network 24 and to the SS7 network 18. As will be discussed presently, the high capacity network 24 and the SS7 network 18 here are respectively specific instances of a datapath network and a status and control network. In FIG. 4 the traditional PSTN elements have been shown in ghost outline to represent their decreased role. The DPN router 104 can be part of a transfer switch 36, as shown, but it may also be separate.

Figure 5:
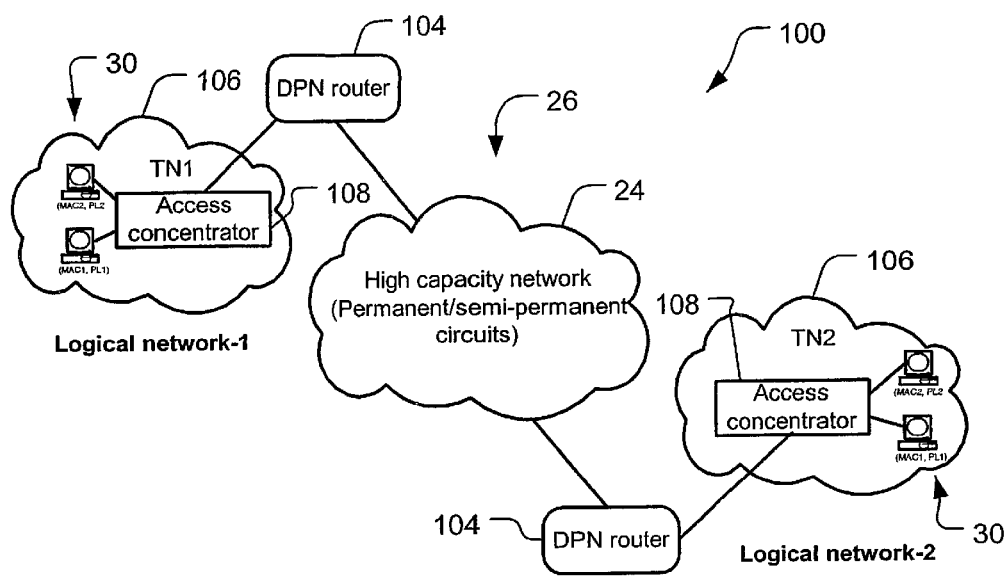
FIG. 5 is a block diagram depicting how, rather than viewing a network as a collection of network devices, the DPN views networks as a collection of sub-or logical networks each containing a terminating node.

FIG. 5 is a block diagram depicting how, rather than viewing a network as a collection of network devices, the DPN 100 views networks as a collection of sub-networks or logical networks 106, each containing a terminating node 108 (typically an access concentrator 32 connected to a variety of CPE 30; those skilled in the art will appreciate that the CPE 30 increasingly include instances of the LAN 12f). The logical networks 106 access the network matrix 26 via the DPN routers 104 present in the transfer switches 36 (FIG. 4). In FIG. 5 the high capacity network 24 is emphasized, as it carries the major communications traffic between the logical networks 106.

There are two main sets of requirements in the DPN 100: requirements for "building" the logical networks 106, and requirements for effectively interconnecting the logical network,s 106. Current packet-oriented technologies are effective in building good logical networks. However, they are not as effective for interconnecting them. A key benefit of the DPN 100 therefore is the ability to integrate the capabilities of current packet networks (e.g., the IP network 16) with current switched networks (e.g., the PSTN 14) and time division multiplexing (TDM) to provide more effective means of supplying current and future networking needs.

The key technologies that are incorporated into the DPN 100 thus are telephony and packet switching. Telephony itself does not currently implement general purpose use of TDM as efficiently as possible, but principles embedded in it do permit efficient implementation of TDM. It also provides efficient signaling and control infrastructures (e.g., via signaling system 7). And it permits unique device identification (e.g., by phone number), with virtual location (such as 800 numbering), and advanced services such as advanced intelligent network (AIN). Packet switching permits layer-2 switching and an efficient link layer (e.g., thin layer-2).

Figure 6:
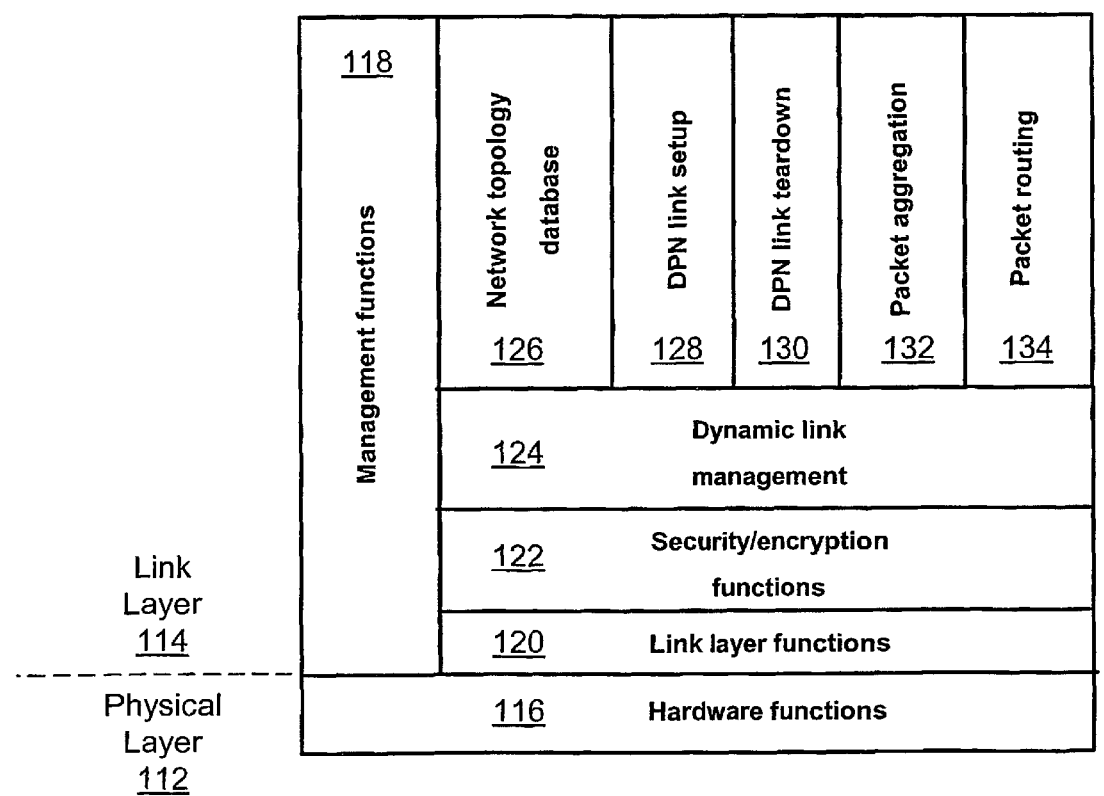
FIG. 6 is a block diagram depicting the functionality in a DPN router as comprising two layers, a physical layer and a link layer.

FIG. 6 is a block diagram depicting the DPN router 104 as comprising two functional layers, a physical layer 112 and a link layer 114. The physical layer 112 includes hardware functions 116 for communicating with the terminating nodes 108 and other DPN routers 104. The link layer 114 includes management functions 118, link layer functions 120, security/encryption functions 122, dynamic link management functions 124, a network topology database 126, link setup functions 128, link teardown functions 130, packet aggregation functions 132, and packet routing functions 134.

Figure 7:
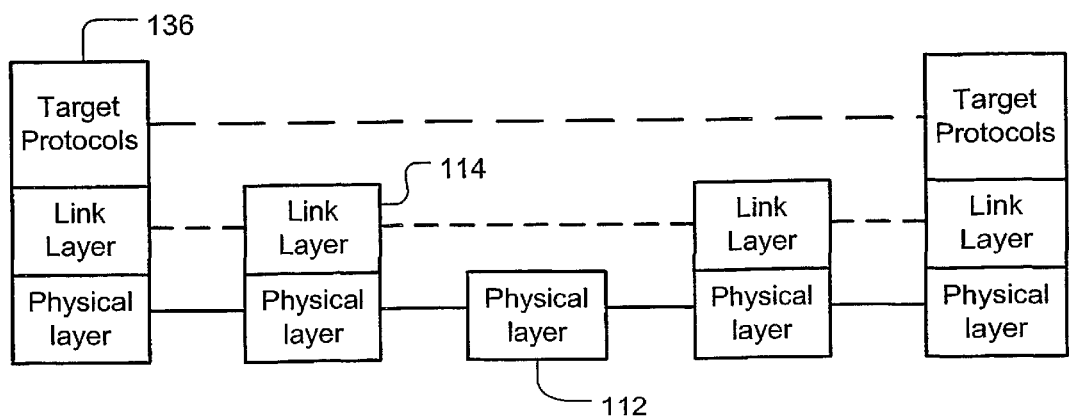
FIG. 7 is a block diagram depicting a simple architecture for the DPN.

FIG. 7 is a block diagram depicting a simple architecture for the DPN 100. Two logical networks 106 (each including a terminating node 108 and one or more CPE 30) access the high capacity network 24 via respective DPN routers 104.

As shown, the logical networks 106, the DPN routers 104, and the high capacity network 24 have compatible physical layers 112. The logical networks 106 and the DPN routers 104 have compatible link layers 114, but the high capacity network 24 does not require this and thus is not burdened by having to support this or devote bandwidth to it. That is, the link layers 114 are transparent across the physical layers 112. Similarly, target protocols 136, for the CPE 30, need only be supported at the respective terminating nodes 108.

The DPN 100 interconnects the separate logical networks 106 by building dedicated circuit switched connections between them, and implementing the link layers 114 which are capable of transporting protocol packets between the logical networks 106 efficiently. A key benefit of this is eliminating the need for routing at intermediate nodes (within the high capacity network 24). Also by having direct connectivity, or a minimum number of intermediate nodes, transit delays are minimized. The goal is to improve network performance (measurable as lower latency and higher security) using circuit switched connections between the logical networks 106, at the expense of lower bandwidth utilization. The network device complexities are thus segregated to logical network devices, and by requiring only the lower layers of the protocols to be supported in the trunking networks (within the high capacity network 24) overall complexity is reduced. This males it easier to build larger trunking networks, and to leverage the current infrastructures and technologies in the trunking networks (e.g., TDM, SONET/SDH, DSx, etc.).

The inventive DPN 100 presently encompasses two types of private networking, or DPN service classes. Class one provides a single new network node to be connected to an already existing private network. In contrast, class two provides a group of network nodes connected together to form a private network. Each of the connecting links between each of the nodes may be on-demand or permanent connections. In addition, each of these connections can be of fixed or variable bandwidth for the links, by adding and removing new connections as required.

With reference also to FIG. 3 (background art), this shows the different links involved between the access concentrator 32 (i.e., at the terminating node 108) and the transfer switch 36 which the DPN 100 has to work with when extending the BTSS 28 to build private data networks. The packet link 40 provided by the transfer switch 36 with each customer premises equipment device (CPE 30) may be used when building the DPN 100. For example, in the BTSS 28 the packet link 40 between the CPE 30 and the transfer switch 36 at a central office switch 38 may be used for implementation of the DPN 100. Accordingly, from the BTSS 28 these identifiers are available for each packet link 40: an identifying telephone number; a media access control (MAC) address; and a packet link identifier (PLD and the identifier (address) used to refer to a specific packet link 40, among the several established on a transfer switch 36.

At the transfer switch 36, the media access control (MAC) addresses provide an unique way to identify the digital types of CPE 30 for use in a packet network like manner, and telephone numbers provide an unique way for identifying the analog types of CPE 30 for use in a telephone network like manner. Accordingly, here the access concentrator 32 and the DPN router 104 use a packet link 40 and MAC addresses for distinguishing the packet traffic between specific digital CPE 30, and the telephone numbers along with provisioned circuits provide for circuit switch connections for distinguishing between specific analog CPE 30.

With reference again to FIG. 4, this depicts a communications infrastructure 102 for implementing the DPN 100.

The transfer switch 36 includes a SONET or other DSx multiplexor (central office multiplexers, COM) to connect to network backbones, where there is sufficient bandwidth. The central office multiplexers provide a means of interfacing to these existing networks. The transfer switch 36 uses the SS7 network 18 for coordinating the setup and tear down of the DPN 100. The telephone number associated with a terminating node 108 (FIG. 5 and 7) is used for originating requests using the SS7 network 18 to ascertain the viability of completing the DPN 100. When an incoming request by the SS7 network 18 with an associated DPN service reaches the transfer switch 36, and it can support the service, the request is accepted. If the terminating node 108 is not itself a transfer switch 36, or does not support the DPN 100, the request is rejected. Once the request is accepted, all of the transfer switches 36 involved in the DPN 100 use the SS7 network 18 to configure DPN trunks provided through the high capacity network 24. Different types of setup and configuration for the DPN 100 can be provided, depending on the types of services needed (see e.g., the DPN service classes, above).

The DPN 100 may be implemented as a module in the transfer switch 36 or it may be a standalone device in a local area network (e.g., even in the LAN 12f) without including either the access concentrator 32 or the transfer switch 36. If the DPN 100 is implemented as a standalone device without transfer switches 36, the multiplexing functions with the high capacity network 24 can be either handled internal to the unit, or can use equipment already available.

Figure 8:
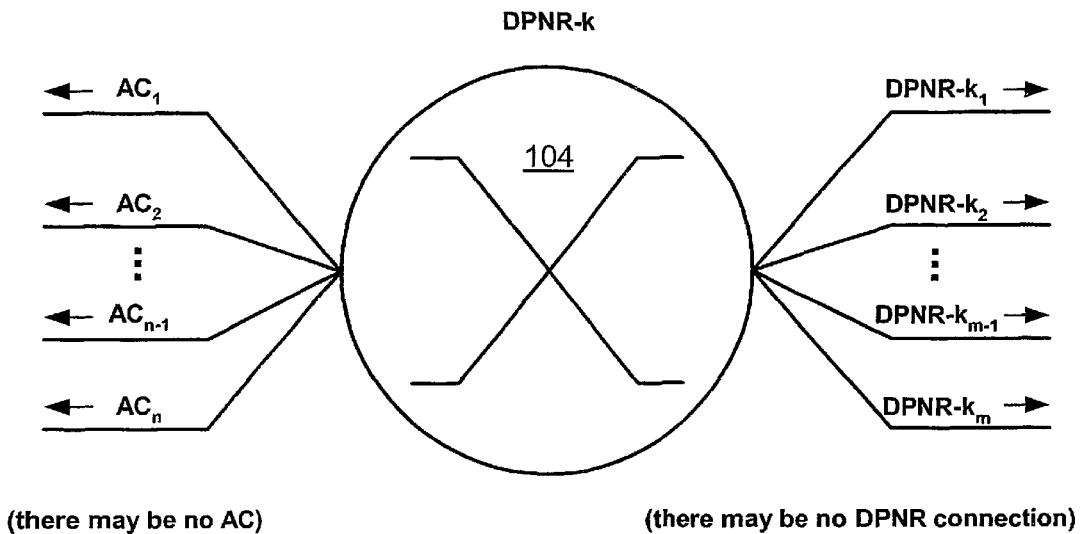
FIG. 8 is a function diagram depicting how the DPN router "sees" other devices and is "seen" in the DPN.

FIG. 8 is a function diagram depicting how the DPN router 104 "sees" other devices and is "seen" in the DPN 100. The DPN router may connect to a plurality of access concentrators 32 (AC), and it may similarly connect to a plurality of other DPN routers 104 (DPNR)(via the network matrix 26).

There are two types of DPN devices. One does setup of the DPN 100, based on an incoming request. The second type is intermediates nodes which are implemented to optimize the network topology and to provide routing between the connecting links within the DPN 100. It is also possible to have devices that implement both.

Figure 9:
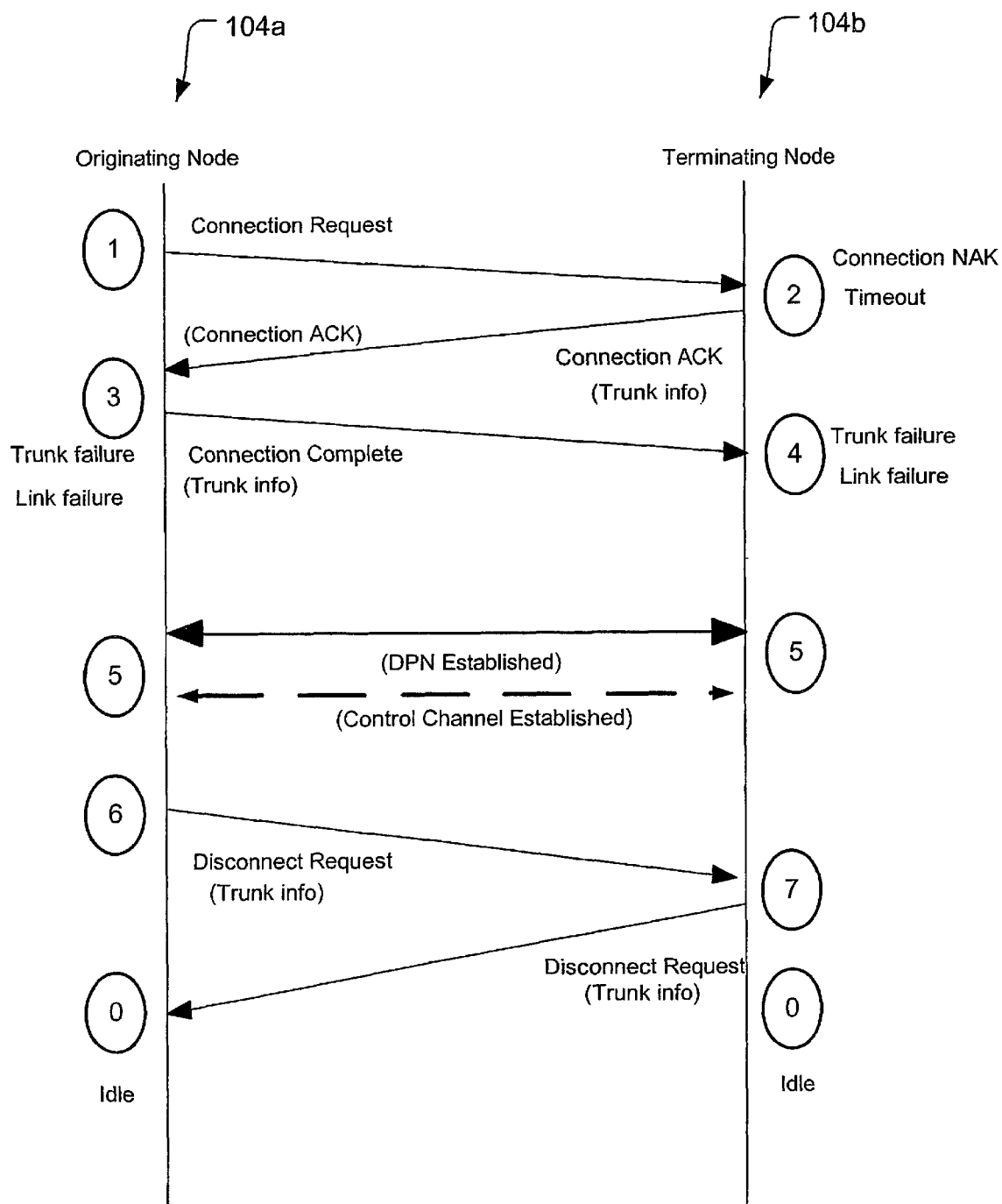
FIG. 9 is a time line depicting TDM (trunk) setup and tear down within the DPN.

FIG. 9 is a time line depicting TDM (trunk) setup and tear down in the DPN 100. A first DPN router 104a is an originating node and a second DPN router 104b is a terminating node here. Upon receiving an incoming request (setup request) from an originating CPE 30a (e.g., FIG. 12), the originating DPN router 104a may use the SS7 network 18 to locate the terminating DPN router 104b for the connection. The terminating DPN router 104b will either have an established connection to CPE 30 (see e.g., FIG. 4–5), or can setup such a connection upon receiving a connection request from a new, terminating CPE 30b. A packet link layer 114 (FIG. 6) is then established between the originating DPN router 104a and the terminating DPN router 104b to carry the traffic between the CPE 30a–b connected to the DPN routers 104a–b.

A circuit switched connection will be setup for establishing communication. If there already is an existing connection between the originating DPN router 104a and the terminating DPN router 104b, then data between the originating CPE 30a and the terminating CPE 30b is carried over the existing link, otherwise a new circuit connection is setup. The originating DPN router 104a and the terminating DPN router 104b have connectivity to the circuit switched networks (PSTN, SONET, SDH, DSx, INFINIBAND, etc.), either directly or indirectly through other multiplexing devices. Additional circuits may also be setup if the existing link utilization exceeds selectable threshold levels, and extra circuit connections are dropped when the traffic level drops.

The DPN routers 104a–b use the media access control (MAC) addresses (when they are available) to switch the data between different connections. If the MAC address is not available, because the addressing is based on different scheme, packet forwarding is implemented. A key feature is that no routing functions are performed on intermediate nodes. All routing related issues are handled at the originating access network 20 (either a LAN, WAN, or other type of network) and the terminating access network 20. In essence, the DPN routers 104a–b transparently integrate the originating and terminating access networks 20 (and thus the CPE 30a–b on them) as if they were directly connected. This allows all addressing, routing, transport, and session issues to be handled by the devices present on these access networks 20.

The key issue in order to make this scheme work is avoiding address collisions through the several layers of indirection. The same media access control (MAC) (or other device address) may get duplicated in the DPN 100, resulting in communication degradation or failure. The solution to this is to use the unique, existing telephony numbering scheme and to use the SS7 network 18 for control to identify and locate access networks 20 and related nodes (DPN routers 104a–b) in a way to avoid such address collisions.

Summarizing, core capabilities are integrated to form devices that will enhance performance of existing communications infrastructure and devices. The addressing schemes and directory distribution capabilities deployed in the telephony system are used to determine the identity and location of network nodes using the DPN 100. Devices in the DPN 100 have two main functions. First, they setup and tear down TDM links for connecting logical networks 106. Second, they provide packet switching (layer-2 switching) or packet forwarding between the established TDM links.

Figure 10:
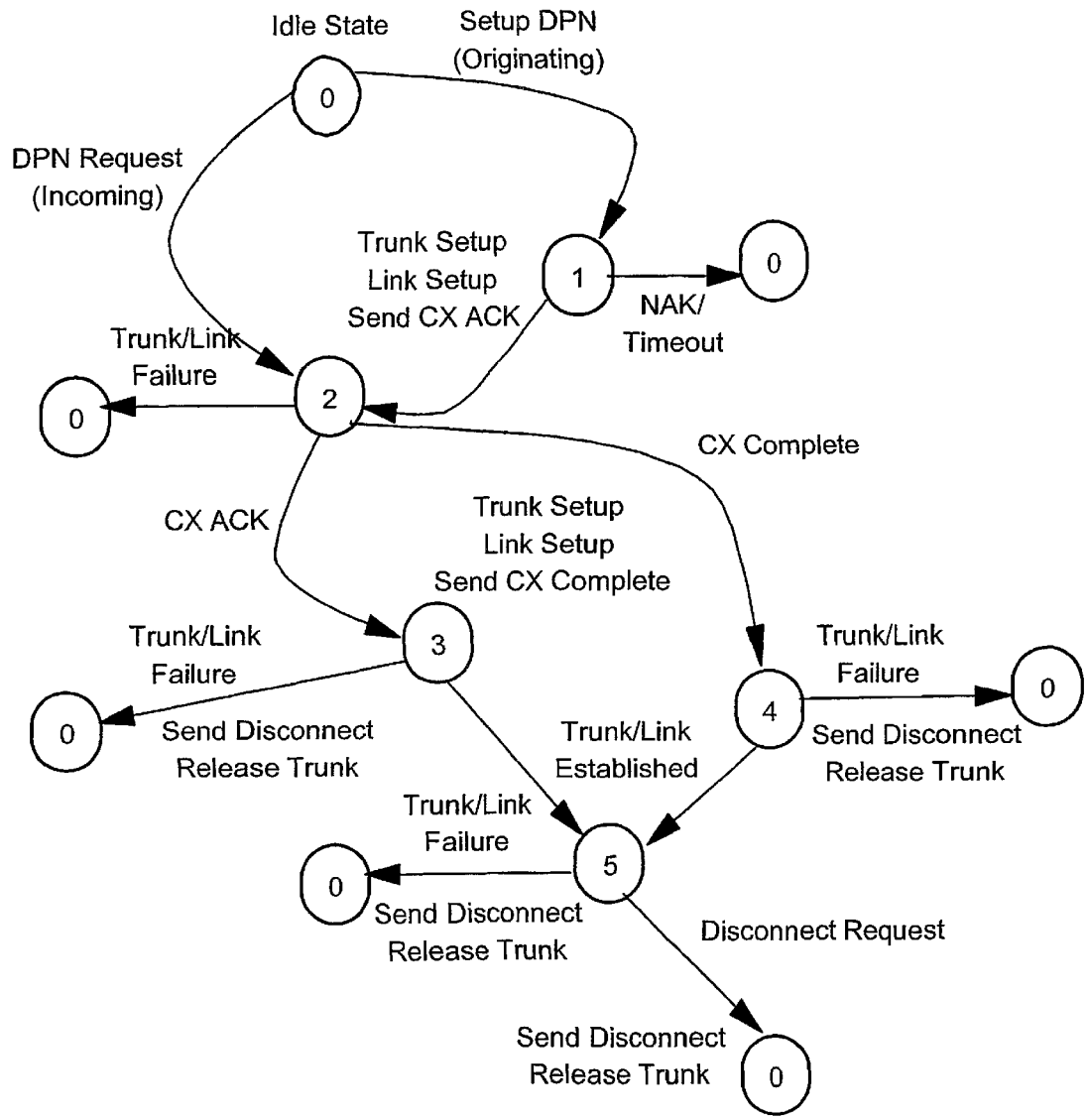
FIG. 10 is a state diagram depicting the TDM setup and tear down of FIG. 9.

FIG. 10 is a state diagram depicting TDM (trunk) setup and tear down. The SS7 network 1X is used for exchanging the messages involved. The SS7 network 18 provides two methods of exchanging this information. The first is using the ISUP (ISDN user part), and the other is with the help of a transaction capabilities application part (TCAP). The ISUP connection information transfer capabilities are appropriate for smaller systems. While the transaction capabilities application part (TCAP) capabilities can support large scale systems. It is even possible to use in-band signaling (e.g., DTMF tones) for setting up the connections, without the need for the SS7 network 18. However, the need for such a configuration is likely to be limited, as the SS7 network 18 is already widely deployed.

An existing or a new telephony numbering system that has the location and identity feature like the telephone number is associated with each DPN routers 104a–b. The SS7 network 18 then has the ability to transfer connection information between the DPN routers 104a–b. For example, in the high capacity network 24, the connection information includes the SONET/SDH/DSx interface identifier and the trunk on which the link is to be established.

The current trend of building future networks based on packet switching has several limitations. A basic DPN architecture and topology have been presented above. Next a generalized DPN architecture and topology are covered, ones that provide for building networks with enhanced performance by combining the strengths of packet and circuit switching. The generalization of the DPN 100 which will be used here consists of a DPN feedback system, a feedback system that integrates specialized networks built with functionally homogeneous nodes, three logical network types, and associated physical networks.

Figure 11:
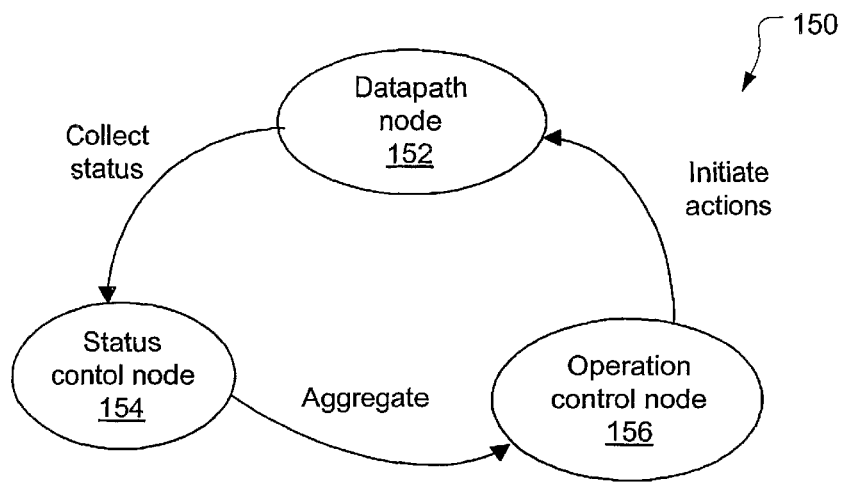
FIG. 11 is a state diagram depicting how a feedback system according to the DPN includes the basic nodes.

FIG. 11 is a state diagram depicting a feedback system 150 for the DPN 100. Included are the basic subsystems of a datapath node 152, a status control node 154, and an operation control node 156. The datapath node 152 handles the basic communications traffic; the status control node 154 receives status data collected from the datapath node 152; the operation control node 156 receives aggregate data from the status control node 154; and the datapath node 152 receives action requests from the operation control node 156. The nodes 152, 154, 156 may use one or more management protocols (e.g., SS7 or CMIP) when they are part of a physical network, or an intra-system interface when they are part of the same sub-system (e.g. inter-process communication, IPC).

Figure 12:
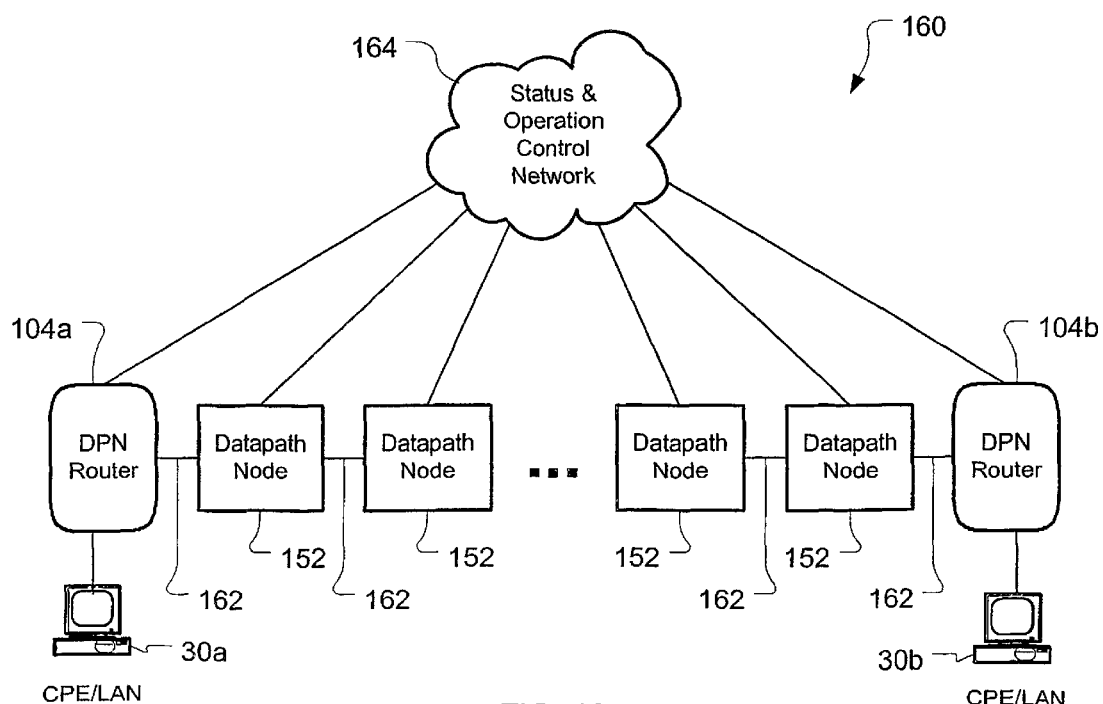
FIG. 12 is a block diagram depicting a generalized architecture according to the DPN.

FIG. 12 is a block diagram depicting a generalized architecture 160 according to the DPN 100. Two sets of customer premise equipment (CPE 30a, 30b) represent the end-systems between which it is desired to facilitate communications. Here it is assumed that the CPE 30a, 30b are transfer network compatible (i.e., they have built-in access concentrator 32 functionality as defined in BTSS or an equivalent). The CPE 30a, 30b each have an associated DPN router 104a, 104b and are separated by a plurality of the datapath nodes 152. The datapath nodes 152 are linked by data trunk connections 162 through which all of the communicated data types are transferred between the CPE 30a, 30b. A status and operation control network (SOC network 164; collectively the status control nodes 154 and operation control nodes 156 perform monitoring, control, and the management functions necessary for effective utilization of the datapath nodes 152 and their associated data trunk connections 162.

Figure 15:
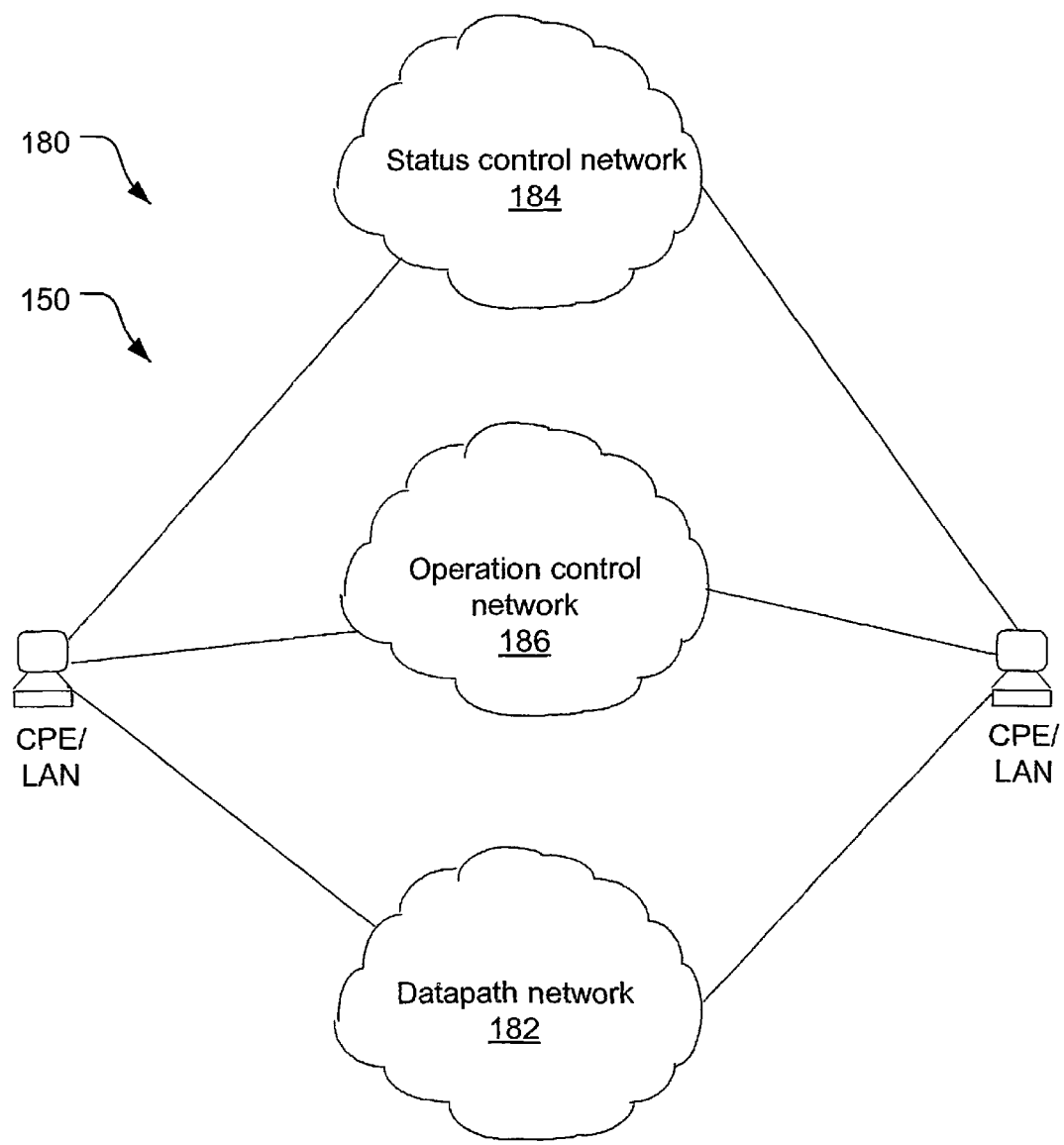
FIG. 15 is a block diagram depicting a generalized topology according to the DPN.

Depending on end application requirements, the SOC network 164 may be the same network (FIG. 12) or separate networks (FIG. 15). The SOC network 164 may be a special application of the SS7 network 18 (FIG. 1, 2, 4). This DPN generalized architecture 160 is built by overlaying one or more physical networks of connected datapath nodes 152, and the SOC network 164 of connected status control nodes 154, and operation control nodes 156.

Figure 13:
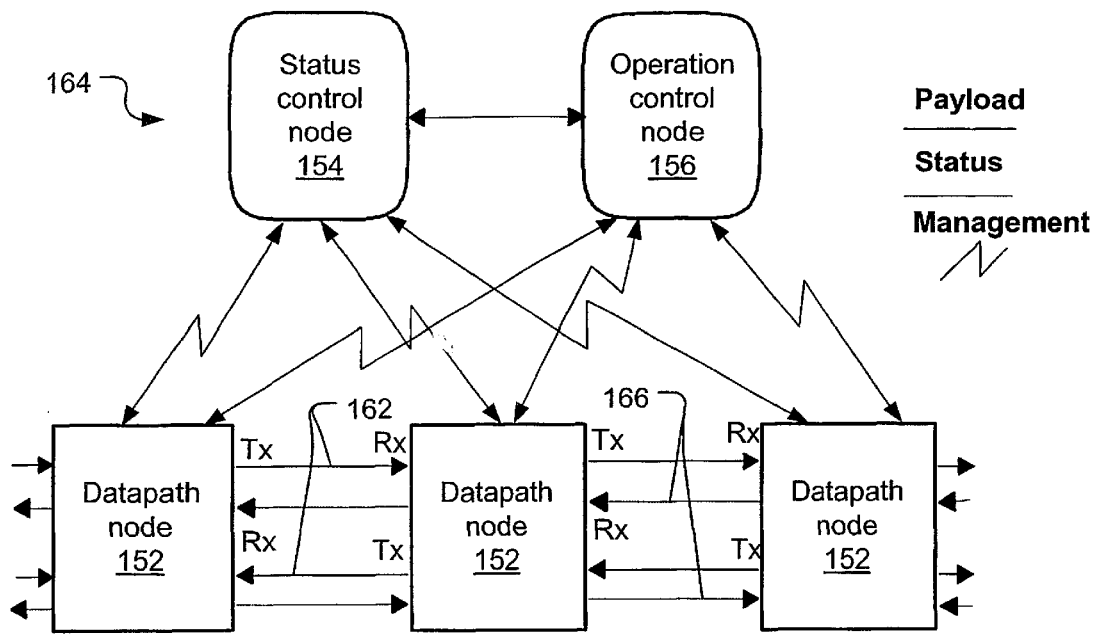
FIG. 13 is a block diagram depicting the details of the interfaces between a status and control network and the datapath nodes.

FIG. 13 is a block diagram depicting the details of the interfaces between the SOC network 164 and the datapath nodes 152. The datapath nodes 152 have data trunk connections 162 consisting of a transmit link (Tx) and a receive link (Rx). In addition, there may be a reverse channel 166 (e.g., ESF channel or embedded signaling in T1/E1 lines). The function of the reverse channel 166 is to provide reception status information about the signal being transmitted, such as loss of signal, bit error threshold, and other alarm conditions. The status information pertains to the integrity of the bit level transmissions. A key objective here is obtaining the status of the signal being received and the state of the adjacent datapath node 152 to which data is being transmitted. Conceptually, networks of the datapath nodes 152 might appear like networks based on T1/E1/DSx or SONET/SDH when the management protocols and related interfaces used there are removed. Of course, the data trunk connections 162 and appropriate status and control trunk connections may be built from any type of transmission media, e.g., wireline or wireless. Further, as a special case, a single high capacity transmission media may be used to carry data, status, and control links.

Figure 14:
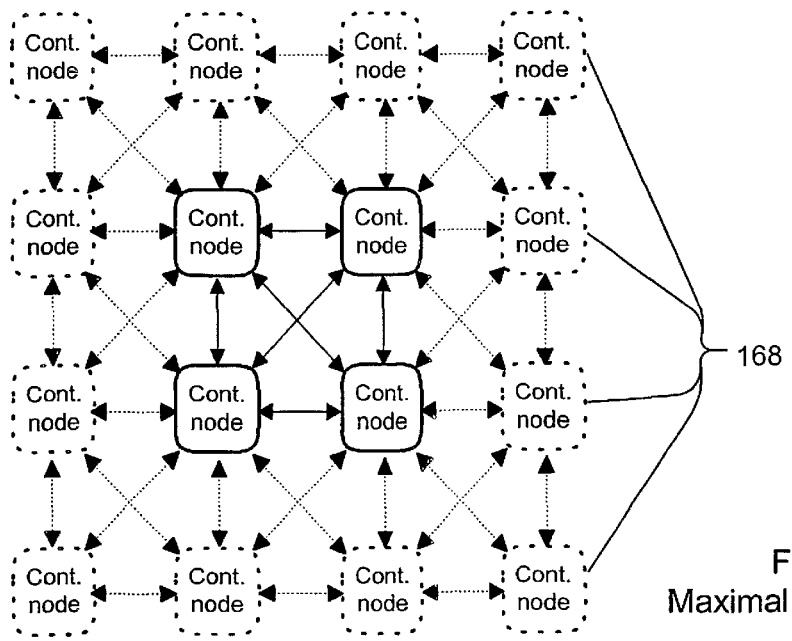
FIG. 14 is a block diagram depicting a configuration to support maximum connectivity between adjacent control nodes.

FIG. 14 is a block diagram depicting a configuration to support maximum connectivity between adjacent control nodes 168 (e.g., status control nodes 154 and operation control nodes 156) and to provide for the highest level of fault recovery and tolerance.

FIG. 15 is a block diagram depicting a generalized topology 180 according to the DPN 100. Here the datapath nodes 152 form a datapath network 182, the status control nodes 154 form a status control network 184, and the operation control nodes 156 form an operation control network 186. In sum, the networks 182, 184, 186 thus created form a powerful embodiment of the feedback system 150.

The approach to connectivity shown in FIG. 14 may be appropriate for the status control network 184 and the operation control network 186 here. In the datapath network 182, however, a sufficient lowest level of connectivity may be only a single linkage (e.g., data trunk connection 162) between adjacent nodes, and this is represented in FIG. 12–13.

Summarizing, in the generalized architecture 160 of the DPN 100 there are three logical types of nodes: the datapath node 152, the status control node 154, and the operation control node 156. The function of the datapath node 152 is to perform the transmission, reception, and trunk or channel allocations for the transmission media to which it is attached. Functions performed by the datapath node 152 therefore typically include: transferring payload data, monitoring status and alarm conditions, distributing status and alarm information, maintaining proper working of the datapath trunks and channels, provisioning and managing the datapath trunks and channels, processing and implementing operation control actions (channel/trunk assignment) and management protocols and logic, and maintaining data transfer integrity.

The function of the status control node 154 is to monitor the status of the links and nodes, of environmental conditions, and of other alarm states. Functions performed by the status control node 154 therefore typically include: maintaining proper working of its links, processing and maintaining the status of all neighboring nodes and links (neighboring nodes include adjacent nodes and other nodes for which a the status control node 154 keeps track of status information), transferring node and link status information to the operation control nodes 156, and implementing data recovery actions on its link to the datapath node 152.

The operation control node 156 uses current status information and operational data to initiate actions to make the necessary changes at the other nodes involved. Functions performed by the operation control node 156 therefore typically include: maintaining proper working of its links, processing and maintaining the status of all neighboring nodes and links (neighboring nodes include adjacent nodes and other nodes for which an operation control node 156 keeps track of status information), requesting node and link status information from the status control nodes 154, implementing link recovery actions, detecting datapath channel and trunk failures, and executing datapath fault recovery and protection schemes.

Current systems combine their logical functions most equivalent to those of the nodes 152, 154, 156 into the same network device, except in highly specialized cases (resulting in a loss of network perspective). The gist of the inventive DPN 100, however, is building networks from functionally equivalent nodes, and integrating those into the feedback system 150 to create superior performance and reduced node level complexity. In this manner the feedback system 150 helps to provide fault recovery, reliability, and redundancy.

The logical capability of the nodes 152, 154, 156 may be combined and the functionality embedded in a single physical network device. The feedback system 150 thus may be centralized, or it may be embedded as a distributed capability throughout the network fabric on all or selected nodes. The feedback system 150 along with the logic implemented in each of the nodes 152, 154, 156 enables implementing stable network operations and the ability to recover from failure conditions. Reduced to embodiment, the logical node types may be part of separate physical devices, or two, or all three logical node types may be combined in a single physical node. The physical devices may then be connected for homogeneous networks. Forming separate networks of similar devices enables implementing uniform classes and levels of service. The requirements of these physical networks may vary. For example, the datapath network 182 may need high bandwidth capacity, whereas the control networks (status control network 184 and operation control network 186) are likely to need low latency.

With reference again to FIG. 13, this also shows how the tasks of the status and operation control network (SOC network 164) goes beyond keeping the datapath nodes 152 operational, and taking data recovery actions. The SOC network 164 provides an ideal means of supplying on-demand connection setup for end-system devices, applications, and services. In addition, the SOC network 164 may also carry information about the status and availability of unconnected nodes, systems, applications, services, and people (e.g., online presence, absence, access privileges, etc.). The SOC network 164 can also expedite the handling of information regarding the status, availability, and presence of various objects related to web services.

Depending on the normal state of the end-system, dormant or active, different connectivity schemes can be implemented to the SOC network 164. If the predominant data is status information, the status control node 154 may be used for idle or low activity states. If the predominant data is action-oriented, then connectivity to the operation control node 156 is more appropriate for idle or low activity states. A change in the systems, applications, services, or presence or absence of an operator or user associated with the end-system will trigger the feedback system 150 to setup connection or disconnection of the datapath nodes 152 to provide a required level of network performance. In addition to network performance functions, the feedback system 150 may be used to trigger alarm and service escalation procedures, or other related services or applications for on-demand enhancement of system functionality (rather than being limited to fault detection and recovery).

Figure 16:
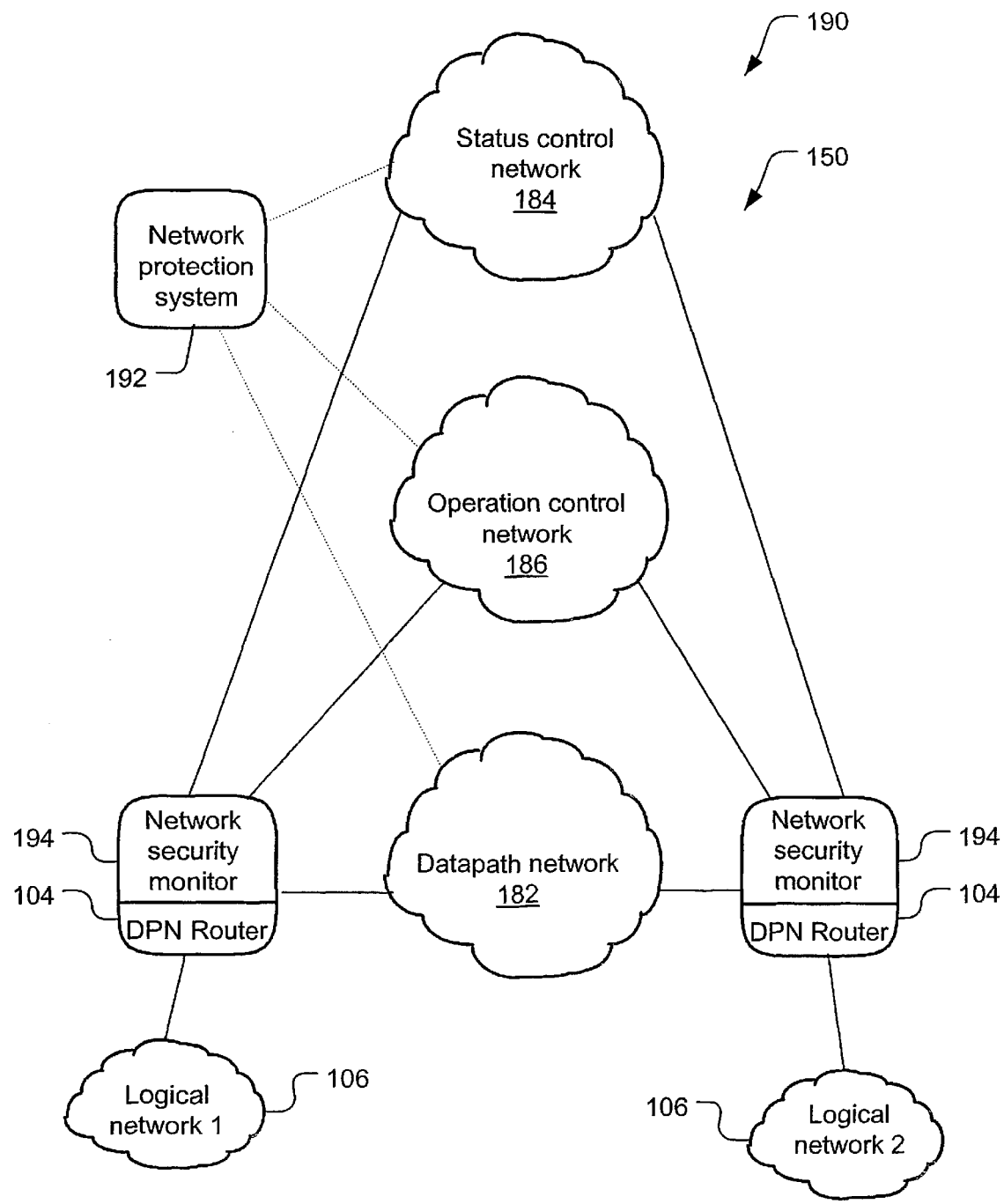
FIG. 16 is a block diagram depicting how a generalized architecture of the DPN can be adapted to include a network protection framework.

FIG. 16 is a block diagram depicting how a generalized architecture 160 of the DPN 100 can be adapted to include a network protection framework (NPF 190). The NPF 190 includes a special embodiment of the feedback system 150, in which a protection system 192 is integrated into the networks 182, 184, 186 and security monitors 194 are added to the DPN routers 104. The security monitors 194 in conjunction with the protection system 192 permit providing comprehensive network threat reduction counter measures.

Network devices in the local loop are at the outer perimeter of any physical facility. This provides a logical location for implementing first level network security measures. The DPN routers 104 (FIG. 4) therefore are ideally located for implementing a completely new network security architecture, different from the traditional approach. In the traditional approach, a firewall is constructed at selected entry points into the protected network. In contrast, by incorporating the NPF 190 into DPN routers 104 it is possible to implement native first level network security features at the outer perimeter of a physical facility, rather than inside it. This approach enables implementation of completely new strategies for intrusion detection, target protection and isolation; attacker identification, isolation, and neutralization. Introducing the DPN routers 104 with the security monitors 194 added at the outer perimeter of a network facility provides an effective way the enhance the network security without having to upgrade any of the systems or introduce new systems within the protected facility.

Basic capabilities in the DPN 100 provide the ability to implement private networks over shared public network infrastructure. Adding encryption and authentication systems to the private network capability then provides required levels of data security. However, handling network attacks adequately requires additional capabilities. These can be implemented using the protection system 192 and the security monitors 194. The security monitors 194 can implement appropriate threat detection schemes, based on the desired level of security. These may include: intrusion monitoring and detection; unauthorized user, application, or service access detection; unauthorized system request detection; unauthorized request origin detection; and suspicious traffic pattern detection.

The security monitors 194, employing an appropriate threat detection scheme or schemes, generate encoded data packets containing relevant information and notify the protection system 192 to trigger protective action at the associated DPN router 104, using the status control network 184 or the operation control network 186. The protective actions may include one or more of: terminating node or network protective isolation, attack originating node or network identification, attack node or network isolation and throttling near an ingress point or points, disconnecting compromised datapath connectivity, and establishing alternate or secondary datapath connectivity.

The protection system 192 incorporates the ability to undertake a wide range of recovery actions from network attacks that include dynamic network reconfiguration and selective blocking and throttling of specific attacking nodes/networks at the earliest network ingress points, in addition to protective isolation of terminating node/network. The protection system 192 provides effective network security schemes with high capability levels compared to those currently in use.

For example, at present there no real solutions for denial of service (DoS) and distributed denial of service attacks. The NPF 190 provides a solution to this problem. A network threat monitor system (NTMS) can be implemented with algorithms to detect that a DoS/DDoS attack by attacking node(s) is in progress against a target node (logical networks 106). Upon detection of the attack, the NTMS can generate a trigger to the feedback system 150 in the NPF 190. Upon receiving the trigger, the NPF 190 can initiate actions that will reconfigure the network connections to the target node under attack. Since the network is now reconfigured, the target node is inaccessible to the attacking node(s). The network connection reconfiguration can be implemented in a manner that retains all required or allowed connections to the target node. In addition, the NPF 190 can take actions to disconnect or throttle the attack traffic from the attacking node(s) reaching the target node.

While the discussion herein has concentrated on examples of applications in the existing large scale telecommunications infrastructure, the DPN 100 is also quite suitable for operation in special purpose network applications. For example, communication needs within an aircraft, ship, space vehicle, other transportation systems, and other self contained networks are ready candidates. With reference again to FIG. 4, 5, 7 and 15, FIG. 4 introduced inventive DPN 100 in the context of an otherwise conventional telecommunications infrastructure 102. However, the DPN 100 is not limited to this. From FIG. 5, 7 and 15 it can be seen that the DPN 100 work within a self contained network. Conceptually, the CPE 30 are not materially different than terminal devices or nodes, such as video or computer terminals, monitoring, sensing, or actuator or monitoring systems as may be used, say, in a ship or aircraft. These terminal devices may have different target protocols 136 than CPE type devices 12a–g. But not materially so and particularly not to an extent effecting the invention's use of the physical layers 112 and link layers 114. As has already been discussed, the necessary roles of the access concentrators 32 can be integrated with those of the DPN routers 104 in single physical devices. And for that matter, all of those capabilities can further be integrated into terminal devices (as they can be with specialized CPE, e.g., specialized LAN routers). As has been emphasized herein, the high capacity network 24 which the DPN 100 is implemented upon may include fiber optic networks as are increasingly used in shipboard and airborne applications. The SS7 network 18 found in conventional telecommunications is, of course, not likely to be found or desirably added to some other self contained networks. But equivalent lower bandwidth mediums (relative to the datapath network 182) are available for implementing the status control network 184 and the operation control network 186 (or an integrated SOC network 164 (FIG. 12)).

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

Industrial Applicability

The present dynamic private network (DPN 100) is well suited for application in the existing communications infrastructure and in other emerging self contained networks. The invention works with a wide variety of terminal devices or customer premises equipment (CPE), and is particularly extendible to new forms of such since concerns regarding target protocols are effectively limited to terminating nodes.

The invention need not effect or burden datapath nodes between the logical networks containing the terminating nodes. The invention similarly does not effect or burden the datapath nodes with link layer details, effectively making link layers to the logical networks transparent across a physical layer connected datapath network of the datapath nodes. Yet further, invention need not burden the datapath network with undue status and operation control data, instead providing for this and control generally with status control notes and operation control nodes or with networks of these.

Today we find the current situation that existing data protocols, like TCP/IP, are built for addressing the needs of connecting larger numbers of computers on a peer-to-peer basis (from a network point of view). However, with the widespread deployment and use of computing devices, there are actually three broad types of networking needs. First, there is the need to interconnect and inter operate with distributed network devices (with each network device viewed as a standalone entity from a network perspective). Second, there is the need for a remote device to connect to a group of network devices that form a functional group, i.e., logical networks (a group of network devices that provide a collection of applications and services, e.g., a corporate local area network (LAN)). This situation can be considered to be a special case of the following third case. Third, there is the need for distant logical networks (corporate LANs) to be seamlessly integrated to form a single logical unit (a distributed logical network), even though such may be geographically distributed. As has been noted above, however, current Internet protocols were primarily developed to address the first need, and this has left the second and third needs much wanting. The inventive DPN 100 particular addresses the second and third needs, but not to the exclusion of the first.

Within a generally conventional telecommunications context, a goal of the DPN 100 is a combination of the best of both packet switching and circuit switching to leverage the existing communication infrastructure and technologies to produce superior functionality. Of the three data protocol needs discussed above in the Background Art section, current Internet protocols address only the first need, while the DPN 100 particularly addresses the second and third needs in a way that is more effective than using existing approaches.

The invention may employ a network matrix which may include some, all or more than public switch telephone, Internet protocol, special service, and high capacity networks. As the high capacity networks particularly may include fiber optic or satellite links, this permits the invention to very efficiently supplement or supercede existing circuit switched telecommunications infrastructures.

The invention is, however, also quite suitable for use in self contained networks, as are emerging, for example, in complex transportation vessels like ships, aircraft, and space craft. In both telecommunications and other self contained network contexts the inventive DPN 100 provides an efficient feedback system 150 and may optionally provide a powerful network protection framework (NPF 190).

For the above, and other, reasons, it is expected that the DPN 100 of the present invention will have widespread industrial applicability and it is expected that the commercial utility of the present invention will be extensive and long lasting.

What is claimed is:

1. A dynamic private network for communicating between customer premises equipment (CPE), comprising:

a plurality of access concentrators each connected to instances of the CPE to form respective logical networks;

a plurality of dynamic private network routers (DPN routers) each operationally connected to at least one said logical network, wherein said DPN routers are suitable to both switch analog data and route digital data and said DPN routers connect to at least one data network other than a public switched telephone network (PSTN) to permit both switching said analog data and routing said digital data past said PSTN;

a datapath network to which said plurality of DPN routers are operationally connected to permit communications between said instances of the CPE in said respective logical networks, wherein said datapath network includes said PSTN and said data network; and a status and control network (SOC network) including a plurality of physical nodes including at least one status control node and one operation control node which are physically distinct, to which said datapath network is operationally connected to permit controlling operation of the dynamic private network.

2. The dynamic private network of claim 1, wherein the CPE include units chosen from the set consisting of analog and digital telecommunications devices.

3. The dynamic private network of claim 2, wherein at least one said analog telecommunications devices is a plain old telephone system (POTS) type device.

4. The dynamic private network of claim 2, wherein at least one said digital telecommunications devices is a member of the set consisting of alarms, monitoring and reporting systems, computers, and local area networks (LAN).

5. The dynamic private network of claim 1, wherein at least one said access concentrator is integrated into its respective said DPN router.

6. The dynamic private network of claim 1, wherein:
respective said logical networks and said DPN routers are operationally connected via respective compatible link layers; and
said plurality of DPN routers are operationally connected via a physical layer through said datapath network, wherein said link layers are transparent to said datapath network.

7. The dynamic private network of claim 1, wherein at least one said DPN router routes communications to a said logical network based on a telephone number.

8. The dynamic private network of claim 7, wherein communications within said logical network between its said access concentrator and at least one of its CPE is also routed based on said telephone number.

9. The dynamic private network of claim 1, wherein at least one said DPN router routes communications to a said logical network based on a media access control (MAC) address.

10. The dynamic private network of claim 9, wherein communications within said logical network between its said access concentrator and at least one of its CPE is also routed based on said MAC address.

11. The dynamic private network of claim 1, wherein:
said DPN routers are operationally connected through said datapath network by a packet link; and
said DPN routers route communications based on a packet link identifier.

12. The dynamic private network of claim 11, wherein said packet link identifier is based on at least one member of the set consisting of telephone numbers and MAC addresses, thereby facilitating unique identification of source and target logical networks and the CPE therein, wherein the CPE therein may be either an analog or a digital type yet be identified based on either or both of a said telephone number or a said MAC address.

13. The dynamic private network of claim 1, wherein at least one said DPN router is integrated into a transfer switch.

14. The dynamic private network of claim 1, wherein at least one said DPN router is integrated into a LAN which is an instance of the CPE.

15. The dynamic private network of claim 1, wherein said datapath network includes a plurality of physical nodes.

16. The dynamic private network of claim 1, wherein said data network includes a high capacity network.

17. The dynamic private network of claim 16, wherein said high capacity network includes a fiber optic network employing at least one of the set of protocols consisting of SONET, SDH, DSx, and INFINIBAND, as such protocols were used in November 2000.

18. The dynamic private network of claim 1, wherein said SOC network includes a signaling system 7 network, as such protocol was used in November 2000.

19. A dynamic private network for communicating between customer premises equipment (CPE), comprising:
a plurality of access concentrator means for connecting instances of the CPE to form respective logical networks;
a plurality of dynamic private network router means (DPN router means) for operationally connecting to at least one said logical network, wherein said DPN router means include means for both switching analog data and routing digital data and said DPN routers connect to at least one data network other than a public switched telephone network (PSTN) to permit both switching said analog data and routing said digital data past said PSTN;
datapath network means for operationally connecting said plurality of DPN router means to permit communications between said instances of the CPE in said respective logical networks, wherein said datapath network means includes said PSTN and said data network; and
status and control network means (SOC network means), including a plurality of physical nodes including at least one status control means and one operation control means which are physically distinct, for operationally connecting to said datapath network means and controlling operation of the dynamic private network.

20. The dynamic private network of claim 19, wherein at least one said access concentrator means is integrated into its respective said DPN router means.

21. The dynamic private network of claim 19, further comprising:
link layer means for operationally connecting respective said logical networks and said DPN router means; and
physical layer means for operationally connecting said plurality of DPN router means through said datapath network means, wherein said link layer means are transparent to said datapath network means.

22. The dynamic private network of claim 19, wherein at least one said DPN router means routes communications to a said logical network means based on a telephone number.

23. The dynamic private network of claim 22, wherein communications within said logical network means between its said access concentrator means and at least one of its CPE is also routed based on said telephone number.

24. The dynamic private network of claim 19, wherein at least one said DPN router means routes communications to a said logical network means based on a media access control (MAC) address.

25. The dynamic private network of claim 24, wherein communications within said logical network means between its said access concentrator means and at least one of its CPE is also routed based on said MAC address.

26. The dynamic private network of claim 19, wherein:
said DPN router means are operationally connected through said datapath network by a packet link; and
said DPN router means are further for routing communications based on a packet link identifier.

27. The dynamic private network of claim 19, wherein at least one said DPN router means is integrated into a transfer switch.

28. The dynamic private network of claim 19, wherein at least one said DPN router means is integrated into a LAN which is an instance of the CPE.

29. The dynamic private network of claim 22, wherein said datapath network means includes a plurality of physical nodes.

30. The dynamic private network of claim 19, wherein said data network includes a high capacity network.

31. The dynamic private network of claim 30, wherein said high capacity network includes a fiber optic network employing at least one of the set of protocols consisting of SONET, SDH, DSx, and INFINIBAND, as such protocols were used in November 2000.

32. The dynamic private network of claim 19, wherein said SOC network includes a signaling system 7 network, as such protocol was used in November 2000.

33. A dynamic private network for communicating between customer premises equipment (CPE), comprising:
- a plurality of access concentrators each connected to instances of the CPE to form respective logical networks;
- a plurality of dynamic private network routers (DPN routers) each operationally connected to at least one said logical network, wherein respective said logical networks and said DPN routers are operationally connected via respective compatible link layers, and wherein said DPN routers are suitable to both switch analog data and route digital data and said DPN routers connect to at least one data network other than a public switched telephone network (PSTN) to permit both switching said analog data and routing said digital data past said PSTN;
- a datapath network to which said plurality of DPN routers are operationally connected to permit communications between said instances of the CPE in said respective logical networks, wherein said plurality of DPN routers are operationally connected via a physical layer through said datapath network, wherein said link layers are transparent to said datapath network, and wherein said datapath network includes said PSTN and said data network; and
- a status and control network (SOC network), including a plurality of physical nodes including at least one status control node and one operation control node which are physically distinct, to which said datapath network is operationally connected to permit controlling operation of the dynamic private network.

34. A dynamic private network for communicating between customer premises equipment (CPE), comprising:
- a plurality of access concentrator means for connecting instances of the CPE to form respective logical networks;
- a plurality of dynamic private network router means (DPN router means) for operationally connecting to at least one said logical network, wherein said DPN router means include means for both switching analog data and routing digital data and said DPN routers connect to at least one data network other than a public switched telephone network (PSTN) to permit both switching said analog data and routing said digital data past said PSTN;
- link layer means for operationally connecting respective said logical networks and said DPN router means;
- datapath network means for operationally connecting said plurality of DPN router means to permit communications between said instances of the CPE in said respective logical networks, wherein said datapath network means includes said PSTN and said data network;
- physical layer means for operationally connecting said plurality of DPN router means through said datapath network means, wherein said link layer means are transparent to said datapath network means; and
- status and control network means (SOC network means), including a plurality of physical nodes including at least one status control means and one operation control means which are physically distinct, for operationally connecting to said datapath network means and controlling operation of the dynamic private network.

* * * * *